US009917855B1

(12) United States Patent
Li et al.

(10) Patent No.: US 9,917,855 B1
(45) Date of Patent: Mar. 13, 2018

(54) MIXED ANALYSYS-BASED VIRTUAL MACHINE SANDBOX

(71) Applicant: Trend Micro Incorporated, Tokyo (JP)

(72) Inventors: Yuefeng Li, Nanjing (CN); Xinfeng Liu, Nanjing (CN); Ben Huang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 189 days.

(21) Appl. No.: 15/059,694

(22) Filed: Mar. 3, 2016

(51) Int. Cl.
- G06F 21/00 (2013.01)
- H04L 29/06 (2006.01)
- G06F 11/00 (2006.01)
- G06F 12/14 (2006.01)
- G06F 12/16 (2006.01)
- G08B 23/00 (2006.01)

(52) U.S. Cl.
CPC ...... H04L 63/1416 (2013.01); H04L 63/1425 (2013.01)

(58) Field of Classification Search
None
See application file for complete search history.

(56) References Cited

U.S. PATENT DOCUMENTS

| | | | | |
|---|---|---|---|---|
| 8,990,939 | B2 * | 3/2015 | Staniford | H04L 63/1416 713/187 |
| 9,071,638 | B1 * | 6/2015 | Aziz | G06F 21/554 |
| 9,106,694 | B2 * | 8/2015 | Aziz | G06F 21/56 |
| 9,159,035 | B1 | 10/2015 | Ismael et al. | |
| 9,165,142 | B1 * | 10/2015 | Sanders | G06F 21/566 |
| 9,171,160 | B2 * | 10/2015 | Vincent | G06F 21/566 |
| 2008/0016339 | A1 * | 1/2008 | Shukla | G06F 21/53 713/164 |
| 2011/0078790 | A1 * | 3/2011 | Fazunenko | G06F 9/468 726/22 |
| 2013/0117006 | A1 * | 5/2013 | Varghese | G06F 21/53 703/22 |
| 2014/0380474 | A1 | 12/2014 | Paithane et al. | |
| 2015/0180883 | A1 * | 6/2015 | Aktas | H04L 63/145 726/23 |
| 2015/0309813 | A1 * | 10/2015 | Patel | G06F 8/75 703/22 |

(Continued)

OTHER PUBLICATIONS

Control flow graph—from Wikipedia, the free encyclopedia, 4 sheets [retrieved on Nov. 2, 2015], retrieved from the internet: https://en.wikipedia.org/wiki/Control_flow_graph.

(Continued)

*Primary Examiner* — Eric Chen
(74) *Attorney, Agent, or Firm* — Okamoto & Benedicto LLP (57) ABSTRACT

A sandbox system includes a mixed analysis engine that allows for dynamic and static analysis of a sample process for malware. The sample process is executed in a virtual machine and interrupted to allow the mixed analysis engine to identify functions that are called by malware to perform a malicious behavior. The functions are correlated to identify a behavior node that is indicative of the malicious behavior, and behavior nodes are correlated to identify a behavior net. The behavior net is scored to determine if the sample process is malware.

13 Claims, 6 Drawing Sheets

(56) References Cited

U.S. PATENT DOCUMENTS

2016/0275000 A1* 9/2016 Sharma .............. G06F 11/3664
2017/0251003 A1* 8/2017 Rostami-
 Hesarsorkh ......... H04L 63/1425

OTHER PUBLICATIONS

The JPC Project—the difference between Virtualization and Emulation, 3 sheet [retrieved on Feb. 24, 2016], retrieved from the internet: http://jpc.sourceforge.net/oldsite/Emulation.html.
FireEye White Paper—Advantage FireEye: Debunking the Myth of Sandbox Security, 2013, 6 sheets.

* cited by examiner

MIXED ANALYSYS-BASED VIRTUAL MACHINE SANDBOX

BACKGROUND OF THE INVENTION

1. Field of the Invention

The present invention relates generally to the art of computer security, and more particularly but not exclusively to methods and systems for detecting malware in a virtual machine sandbox.

2. Description of the Background Art

Malwares, i.e., malicious codes, may be detected by analyzing their runtime behavior in a sandbox, such as a suitably-configured virtual machine. Malware coders, who are also referred to as "cybercriminals," have responded by using evasion techniques to hide a malware's malicious behavior when the malware is executed in a virtual machine sandbox. The evasion techniques include checking for traces of a virtual machine environment, stalling, setting logic bombs in binary instructions, hindering execution of user interfaces before performing its true malicious behavior, etc. Some malware may even fail to execute in a sandbox because of a variety of reasons, such as environment dependency, missing supporting dynamic link library (DLL) module, or lack of specific input parameter trigger.

A traditional full system sandbox allows for dynamic evaluation of a sample, i.e., data being evaluated for malware, in the virtual machine. Examples of this type of sandbox include the FIREEYE MVX sandbox and the CUCKOO sandbox. By setting a hook engine in user mode and kernel mode in the guest operating system, or in the hypervisor outside of the virtual machine, the sandbox can collect the application programming interface (API) log that is generated during execution of the sample in the guest operating system. A specific environment is configured in the guest operating system to increase the chance that the sample can start up, e.g., by installing different popular applications. A problem with this type of sandbox is that it has difficulty evaluating the true behavior of malware that employs evasion techniques.

To improve malware detection rate, full system sandboxes have evolved to supplement dynamic analysis with static pattern matching. For example, antivirus scan engines may scan files and memory locations during sample execution. Similarly, network traffic can be monitored (e.g. using the open-source SNORT system) by packet stream filter and pattern matching while the sample is executing. A heuristic scan engine can also be used in conjunction with a sandbox to detect abnormality in portable executable (PE) file structures, e.g., to check for a new segment and import address table (IAT), during runtime. A problem with these approaches is that they rely on pattern matching, and particular patterns need to be continually developed and updated.

SUMMARY

In one embodiment, a sandbox system includes a mixed analysis engine that allows for dynamic and static analysis of a sample process for malware. The sample process is executed in a virtual machine and interrupted to allow the mixed analysis engine to identify functions that are called by malware to perform a malicious behavior. The functions are correlated to identify a behavior node that is indicative of the malicious behavior, and behavior nodes are correlated to identify a behavior net. The behavior net is scored to determine if the sample process is malware.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
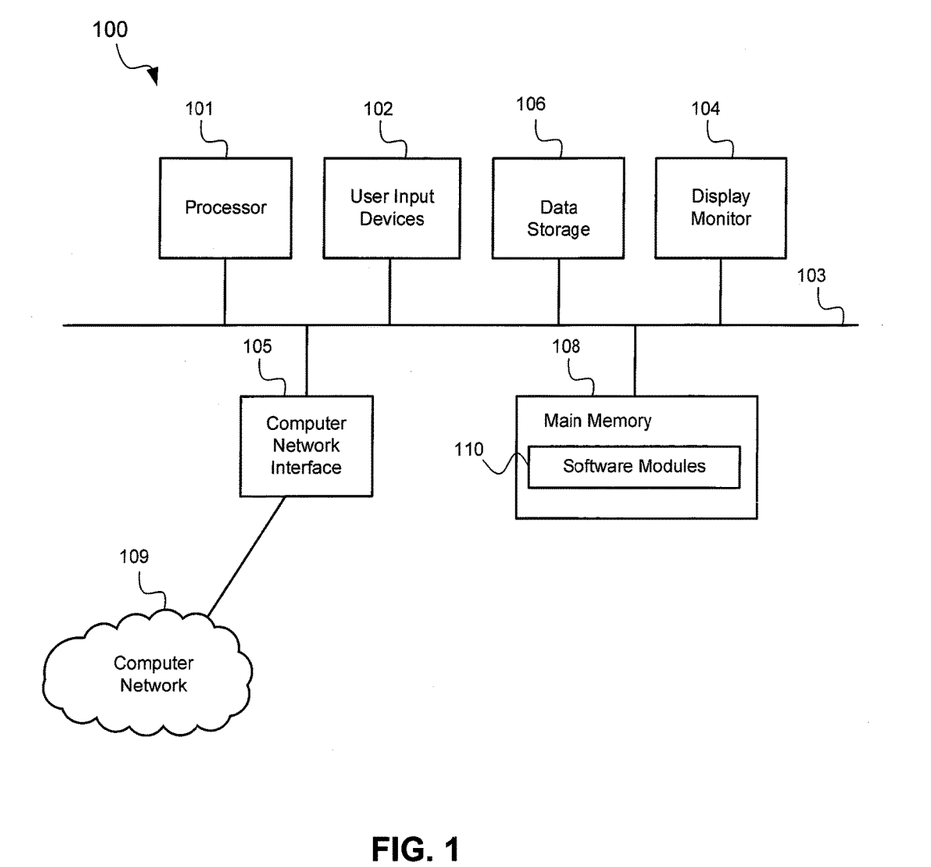
FIG. 1 shows a schematic diagram of a computer system that may be employed with embodiments of the present invention.

FIG. 1 shows a schematic diagram of a computer system 100 that may be employed with embodiments of the present invention. The computer system 100 may be employed as an end user computer, and other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules. In the example of FIG. 1, the software modules comprise modules of a sandbox (e.g., virtual machine, guest operating system, mixed analysis engine, etc.) when the computer system 100 is employed as a sandbox system.

Figure 2:
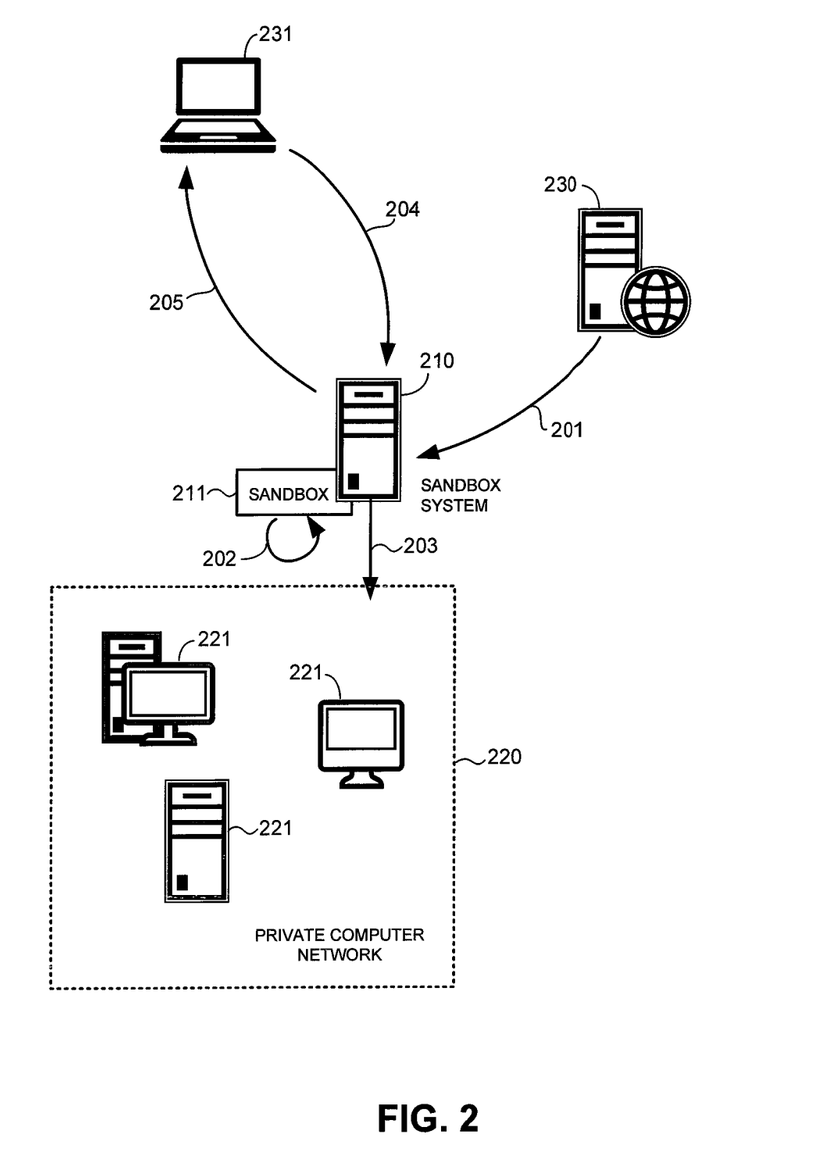
FIG. 2 shows a schematic diagram of a system that includes a sandbox system in accordance with an embodiment of the present invention.

FIG. 2 shows a schematic diagram of a system that includes a sandbox system 210 in accordance with an embodiment of the present invention. In the example of FIG. 2, the sandbox system 210 comprises one or more computers that detect malware by analyzing a sample process (i.e., process of code/data that is being evaluated for malware) in a sandbox 211. The sandbox system 210 may host a plurality of sandboxes 211 to allow for concurrent evaluations of several samples. Only one sandbox 211 is shown and described for clarity of illustration.

The sandbox system 210 may be employed to detect malware for a private computer network or individual computers. In that case, the sandbox system 210 may be on-premise in the private computer network. For example, the sandbox system 210 may be configured to receive all data communications between computers 221 of a private computer network 220 and external computers (i.e., outside the private computer network 220). In that example, the sandbox system 210 may provide firewall and/or gateway functionality to the private computer network 220. More particularly, the sandbox system 210 may receive an executable file (or other data) from a web server 230 (arrow 201), run the executable file in the sandbox 211 to evaluate the executable file for malware (arrow 202), and allow the executable file to be received by a computer 221 in the private computer network 220 when the evaluation indicates that the executable file is clean, i.e., no malware was found (arrow 203). The sandbox system 210 may block the executable file from entering the private computer network 220, or perform other responsive action, when the executable file is detected to be malware.

In other embodiments, the sandbox system 210 performs malware detection in-the-cloud for individual or groups of computers. For example, the sandbox system 210 may receive an executable file from a computer 231 (arrow 204), run the executable file in the sandbox 211 to evaluate the executable file for malware (arrow 202), and provide a result of the evaluation to the computer 231 (arrow 205). For example, the result may indicate whether or not the executable file is malware.

Figure 3:
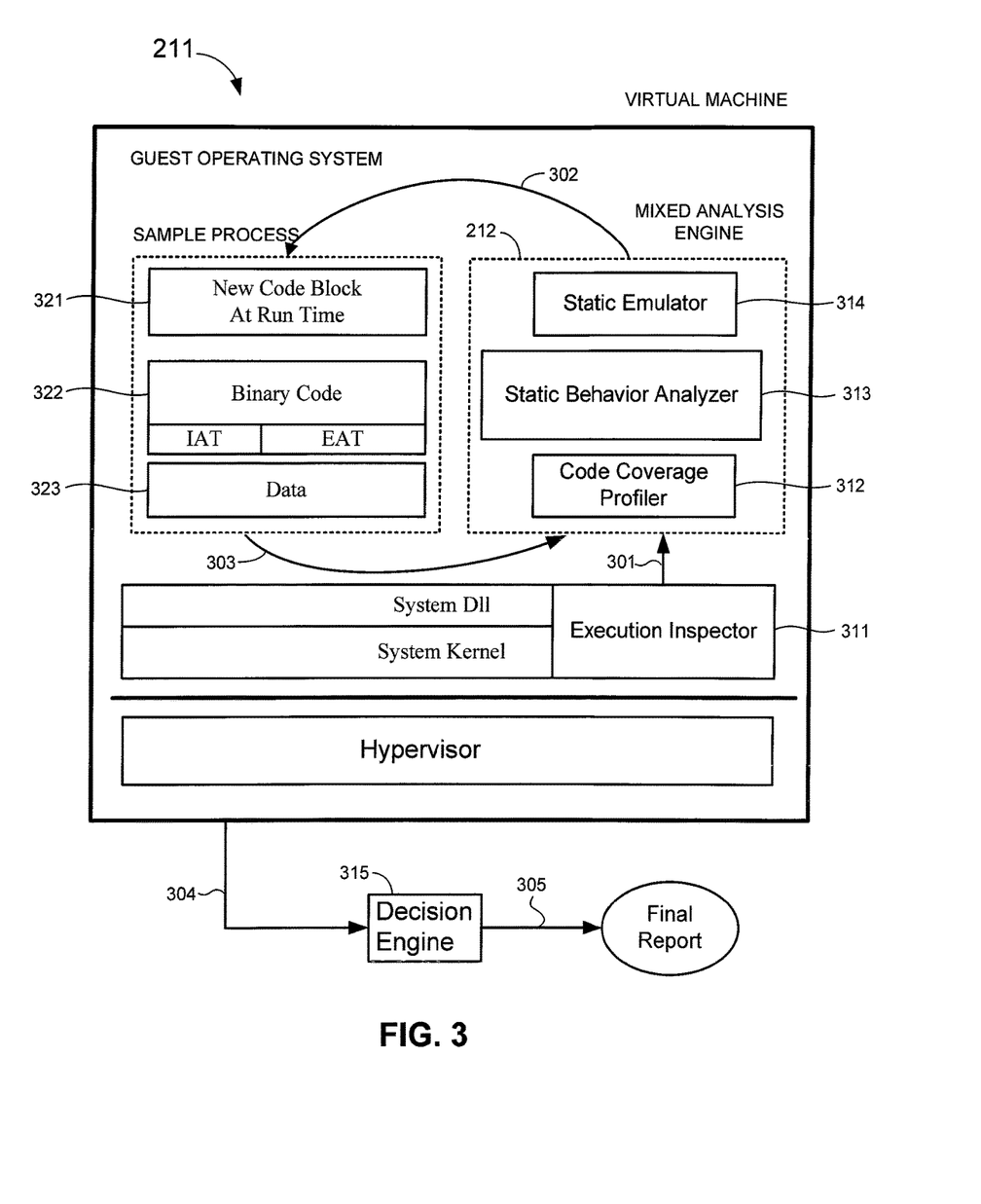
FIG. 3 shows a schematic diagram of a sandbox in accordance with an embodiment of the present invention.

FIG. 3 shows a schematic diagram of the sandbox 211 in accordance with an embodiment of the present invention. In the example of FIG. 3, the sandbox 211 is a full system sandbox that may be implemented in a virtual machine using the open-source QEMU machine emulator and virtualizer, VMWARE virtual machine, VIRTUALBOX system, or other virtualization platform.

In the example of FIG. 3, the sandbox 211 includes a mixed analysis engine for analyzing the runtime behavior of a sample process that is being evaluated for malware. In the example of FIG. 3, the mixed analysis engine comprises an execution inspector 311, a code coverage profiler 312, a static behavior analyzer 313, a static emulator 314, and a decision engine 315.

The mixed analysis engine is so named because it not only performs dynamic analysis of the sample process at runtime, but also performs static analysis of the sample process by interrupting the execution of the sample process and analyzing the sample process while interrupted. The static analysis may involve identifying behavior nodes comprising functions (e.g., application programming interfaces (APIs)) that are called by malware to perform a malicious behavior, and identifying a behavior net comprising the behavior nodes. The mixed analysis engine may perform dynamic analysis of the sample process using any suitable conventional sandboxing technique. The static analysis function of the mixed analysis engine is further discussed below.

In the example of FIG. 3, the sample process is submitted to and executed in the sandbox 211. The sample process may include new code block 321, binary code 322, and other data 323. The new code block 321 comprises a block of instructions that are only apparent at runtime, such as compressed code. The binary code of the sample process may include an import address table (IAT) and export address table (EAT).

In an example operation, the mixed analysis engine may be invoked during execution of the sample process, such as when the execution inspector 311 detects that a checkpoint has been hit during execution of the sample process (arrow 301). In response, the mixed analysis engine analyzes the sample process to look for code that may perform malicious behavior or other characteristics of malware (arrow 302). This cycle of checkpoint hit/analysis continues (arrow 303) until end of the evaluation (e.g., exit of sample process or timeout), at which time the raw log of the evaluation is received by the decision engine 315 (arrow 304) to be scored and formatted into a final report (arrow 305).

In one embodiment, the execution inspector 311 is configured to trace and monitor the execution of the sample process. The execution inspector 311 may trace execution of particular APIs or other functions. The execution inspector 311 may be configured to detect particular stages of sample process execution, which are also referred to herein as "checkpoints." In response to detecting a checkpoint hit, the execution inspector 311 may be configured to interrupt the sample execution and trigger the static behavior analyzer 313 to analyze the sample process while it is interrupted, e.g., suspended.

The execution inspector 311 may be implemented as a system kernel driver or as a system user mode DLL that is injected in the sample process to allow for hooking and recording of API calls or instructions that affect the file system, registry, and network and process operation. In the example of FIG. 3, the execution inspector 311 is implemented to run in the guest operating system. For agent-less design, the execution inspector 311 may be implemented on the hypervisor level instead of in the guest operating system.

In one embodiment, the code coverage profiler 312 is configured to identify hidden code, which may comprise un-executed, seldom executed, or suspicious binary code and/or data segment. The code coverage profiler 312 allows for analysis of sample process behavior that would otherwise be undetected because the corresponding code are not executed in the virtual machine during dynamic analysis.

In one embodiment, the static behavior analyzer 313 is configured to analyze the execution context at checkpoints. In one embodiment, when a checkpoint is hit at runtime, the static behavior analyzer 313 is triggered to find and analyze a possible correlated behavior net based on the current execution context. More particularly, the static behavior analyzer 313 may identify functions that are typically called by malware to perform malicious behavior, to correlate the identified functions to form a behavior node that defines the malicious behavior, and correlate the behavior nodes to form a behavior net. The behavior net comprises a plurality of behavior nodes, and defines a plurality of malicious behaviors that are performed by malware to achieve its malicious objective.

In one embodiment, the static emulator 314 is configured for content calculation based on software emulation when a behavior node can only be correlated by the content of specific variables. For example, the static emulator 314 may be used to calculate content that the behavior analyzer 313 cannot determine. Generally speaking, in contrast to the full system sandbox (which involves virtualization as opposed to emulation) a static emulator is more flexible in controlling target code execution. Artificial and dependent execution context may be readily assigned before the static emulation, whereas it is usually more complicated and harder to control and trace target code execution with the entire full system sandbox. The static emulator 314 may be implemented in the virtual machine of the sandbox, but operated as a separate emulator with its own virtual central processing unit (CPU) and virtual memory (see FIG. 5).

In one embodiment, when the sample process is submitted to the sandbox 211, the execution of the sample process is divided into several stages that are separated by checkpoints. At each checkpoint, the code coverage profiler 312 looks for hidden code by, for example, profiling and statistical analysis. The static behavior analyzer 313 is called to scan and extract out possible behaviors from the hidden code found by the code coverage profiler 312 based on current execution context. The static emulator 314 may be triggered to emulate target code execution to trace data flow (e.g. parameter of an API) or control flow (e.g. an API call) to determine variable contents that cannot be determined by the static behavior analyzer. The execution of the sample process may continue until all possible checkpoints have been hit and processed. A raw log of the evaluation may be generated to determine a score of an identified behavior net.

In one embodiment, the code coverage profiler 312 is configured to examine the sample process to look for and detect hidden code that may perform malicious behavior. For example, the code coverage profiler 312 may perform statistical analysis to find code whose instructions have not been executed, are infrequently executed, or are newly allocated and then executed. Statistics that may be gathered by the code coverage profiler 312 may include instruction execution statistics, API execution statistics, and code entropy statistics.

To alleviate performance concerns because instruction-level traces for code execution may be time consuming, gathering of instruction execution statistics may take advantage of hardware-acceleration features. For example, the Branch Trace Store (BTS) mechanism of INTEL processors may be employed to track branch instructions to profile code blocks that are separated by a branch instruction. API execution statistics is similar to instruction execution statistics but is at the higher, API level. API execution statistics may be gathered by hooking APIs in the guest operating system. Operating system-related profiling features, such as the Event Tracing for Windows (ETW) feature of the WINDOWS operating system, may also be employed. Generally speaking, code entropy statistics may be used to distinguish benign code from malicious code. Similarly, entropy metrics for instruction opcode, operand type, instruction length, etc. may also be employed. The code coverage profiler 312 may also employ other statistics or statistical methods without detracting from the merits of the present invention.

In one embodiment, the static behavior analyzer 313 is configured to identify behavior nodes of a sample process and, from the behavior nodes, identify a behavior net of the sample process. In one embodiment, a behavior net comprises one or more behavior nodes. A behavior node represents a malicious intention of code or binary data at runtime in semantic level. A behavior node may be defined in terms of APIs (or other functions) that are typically called by malware to perform malicious behavior. A plurality of behavior nodes, one for each malicious behavior, may be created by antivirus researchers based on behavior of known malware.

Figure 4:
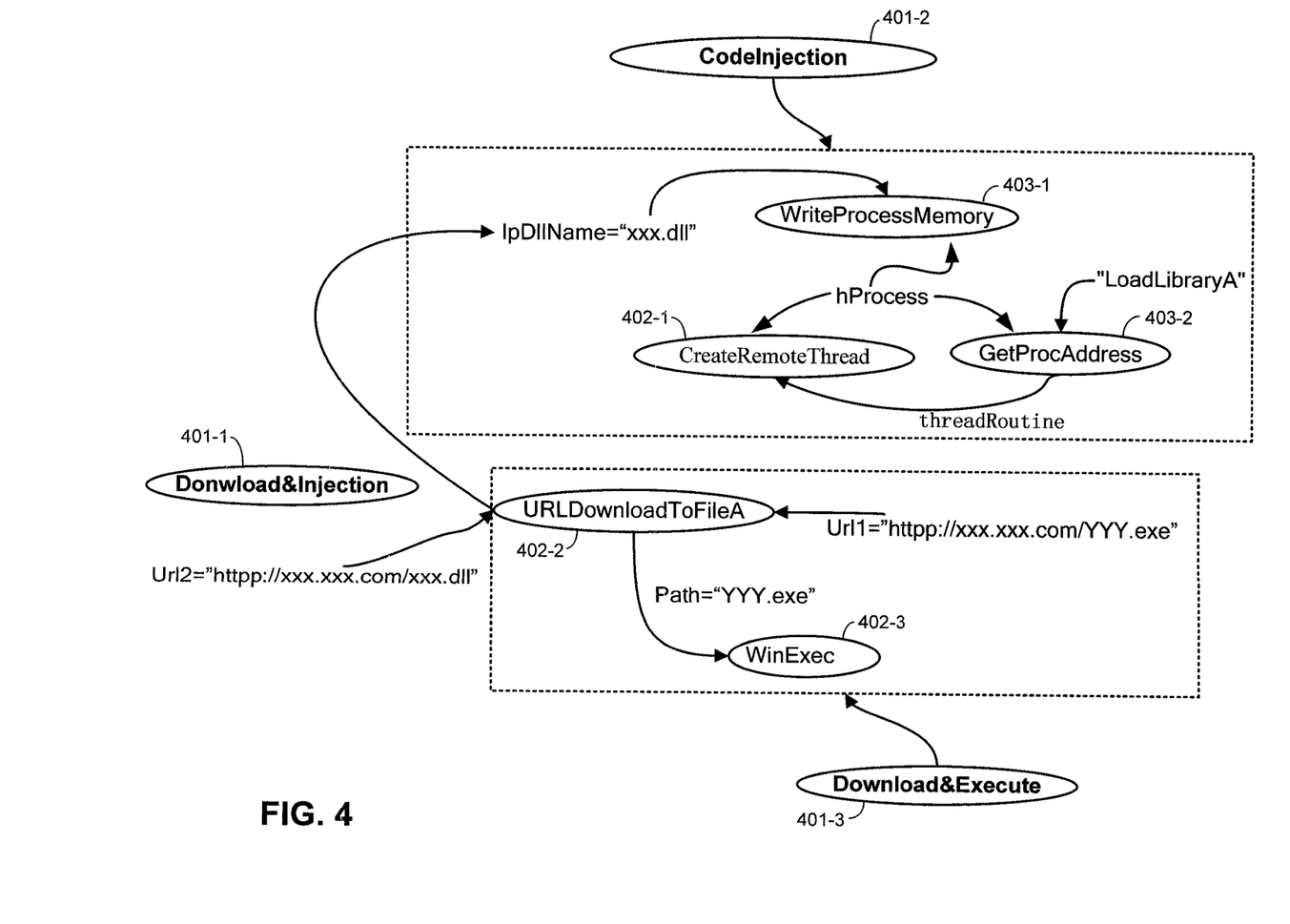
FIG. 4 shows a call diagram of an example behavior net in accordance with an embodiment of the present invention.

FIG. 4 shows a call diagram of an example behavior net in accordance with an embodiment of the present invention. In the example of FIG. 4, the behavior net comprises one or more behavior nodes 401 (i.e., 401-1, 401-2, 401-3, etc.). In the example of FIG. 4, a behavior node is defined in terms of key APIs 402 (i.e., 402-1, 402-2, 402-3, etc.) and affiliating APIs 403 (i.e., 403-1, 403-2, etc.) that are used by malware with particular parameters when performing malicious behavior. A key API 402 is an API that is typically called to perform the defined malware behavior, whereas an affiliating API 403 is an API that is typically called along with the key API 402. APIs may be correlated together to determine if they form a behavior node. In one embodiment, APIs may be correlated as being called from the same process and define a behavior node when APIs use the same variable in one or more parameters.

In the example of FIG. 4, the behavior node 401-2 defines a code injection behavior. The behavior node 401-2, i.e., code injection, may be defined in terms of a key API for code injection, which is the key API 402-1 for creating a remote thread ("CreateRemoteThread"). The behavior node 401-2 may be further defined in terms of affiliating APIs 403-1 ("WriteProcessMemory") and 403-2 ("GetProcAddress"). In the example of FIG. 4, the key API 402-1 and affiliating APIs 403-1 and 403-2 share the same variable "hProcess" as a parameter input, indicating that the these APIs called from the same process and form the behavior node 401-2. As a practical matter, detecting the behavior node 401-2 in the sample process indicates that the sample process may be performing code injection. The syntax of the behavior node 401-2 may described in pseudocode as:

WriteProcessMemory(hProcess, IpDllName);
CreateRemoteThread(hProcess,
threadRoutine=GetProcAddress("LoadLibraryA"));

Similarly, in the example of FIG. 4, the behavior node 401-3 defines a download and execute behavior in terms of key APIs 402-2 ("URLDownloadToFileA") and 402-3 ("WinExec"). The behavior node 401-1 defines a download and code injection behavior in terms of the key API 402-2 and an affiliating API 403-1. In the example of FIG. 4, the behavior nodes 401-1, 401-2, and 401-3 are correlated as belonging to the same sample process and form a behavior net, because the sample process execution indicates that these APIs pass the same parameter variables or parameter variable contents amongst each other. The behavior net formed by the behavior nodes 401-1, 401-2, and 401-3 define a plurality of malicious behaviors performed by the malware to achieve its malicious goal, e.g., steal confidential information, break into a network, etc.

In one embodiment, the static behavior analyzer 313 is triggered to check the sample process for presence of behavior nodes when the execution inspector 311 detects a checkpoint hit. In one embodiment, a checkpoint is a condition where hidden code of the sample process may be identified during sample execution. For example, malware with a code packer typically registers a malicious exception handler and triggers to this specific exception to execute its payload code. Therefore, one possible checkpoint that may be used to trigger the static behavior analyzer 313 is occurrence of an exception. Another possible condition for a checkpoint is when the sample process exits. This is because, in most cases, malware unpacks and leaves its code that have malicious behavior in runtime memory even after its process exits because of evasion check failure.

In one embodiment, address reference-based correlation is handled by the static behavior analyzer 313 and context-based correlation is handled by the static emulator 314. In one embodiment, when a checkpoint is hit, the execution inspector 311 interrupts the execution of the sample process and transfers control to the static behavior analyzer 313. While the execution of the sample process is interrupted, the static behavior analyzer 313 may disassemble any hidden code identified by the code coverage profiler 312. The static behavior analyzer 313 may scan the hidden code for key and affiliating APIs. The static behavior analyzer 313 may identify APIs using a variety of methods, such as by symbolizing specific addresses by mapping the import address table of the sample process. Key and affiliating APIs are usually related with the same variables in the parameters of the APIs. The static behavior analyzer 313 may identify the address of a parameter of an API and scan all references within the scope of the sample process. This allows the static behavior analyzer 313 to correlate the APIs to identify those that form behavior nodes.

When a checkpoint is hit, variables of the API parameters may be calculated into real values for variable correlation to identify behavior nodes. Although the static behavior analyzer 313 may trace the data flow or control flow of hidden code, the static behavior analyzer 313 may not be able to determine the actual content of a variable based on the current execution context. In that case, the static emulator 314 may be invoke to determine the content of the variable for correlation purposes.

Figure 5:
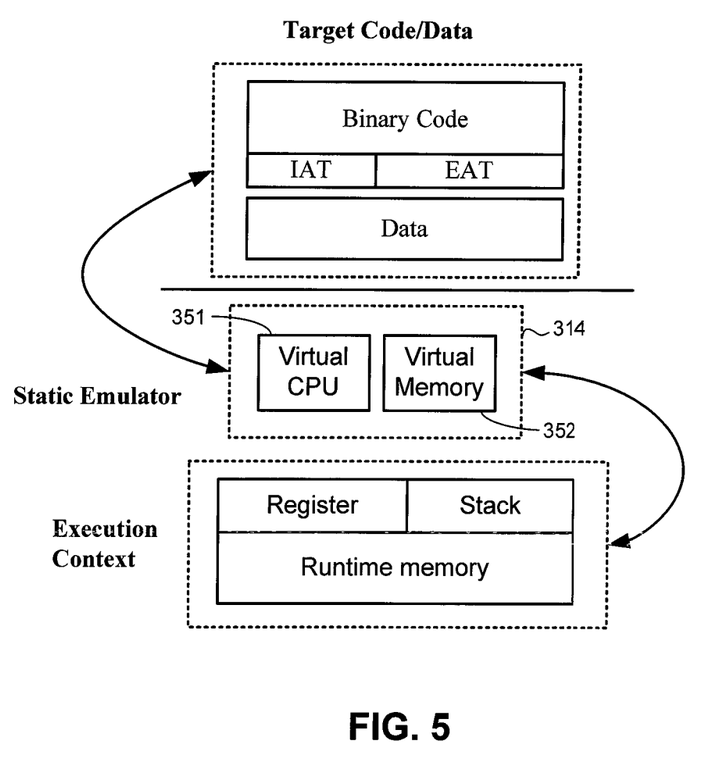
FIG. 5 shows a schematic diagram of a static emulator in accordance with an embodiment of the present invention.

FIG. 5 shows a schematic diagram of the static emulator 314 in accordance with an embodiment of the present invention. As can be appreciated, in contrast to a virtual machine that supports execution of a guest operating system but still primarily uses the hardware central processing unit (CPU) of the host computer for most of the computation, an emulator virtualizes an entire CPU. This allows an emulator to have more control of the execution of the target code. In the example of FIG. 5, the static emulator 314 comprises a virtual CPU 351 and virtual memory 352. In one embodiment, the static emulator 314 is implemented to run on the guest operating system of the virtual machine of the sandbox 211 (see FIG. 3).

In the example of FIG. 5, the target code (which may include instructions and data) to be emulated are assigned by the static behavior analyzer 313 when calculating the content of a particular variable. Calculation of content depends on the current execution context of running the sample process, which includes values of the real CPU register, current stack, and any other runtime memory locations containing system library. That is, execution context depends on the environment in runtime memory for target code execution. In the example of FIG. 5, the runtime execution context is mapped to the emulated data structure of the static emulator 314. The virtual CPU 351 and the virtual memory 352 are loaded to emulate the runtime execution context. The virtual CPU 351 then virtually executes the target code to calculate the needed content.

Figure 6:
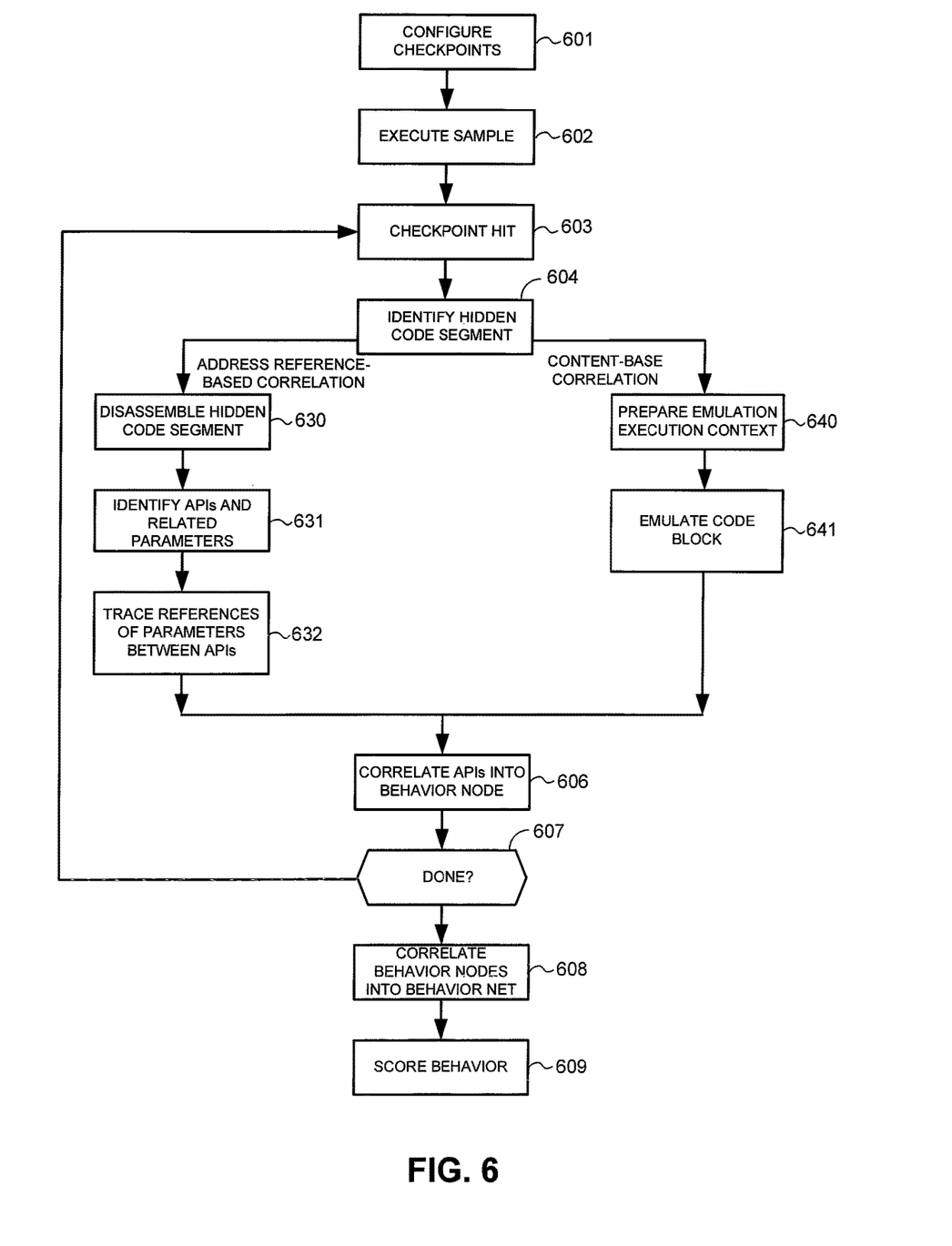
FIG. 6 shows a flow diagram of a method of detecting malware in a virtual machine sandbox in accordance with an embodiment of the present invention.

As a particular example, for the behavior node 401-1 of FIG. 4 ("Download&Inection"), the key API 402-2 ("UrlDownloadToFileA") and affiliating API 403-1 ("WriteProcessMemory") are correlated with the file "xxx.dll", which may be a parameter input in different APIs. In that case, the static emulator 314 may be employed to get the contents of variables of parameters of the key API 402-2 and affiliating API 403-1 (e.g., path and IpDLLName). When calculation of the contents of these variables reveal that they share the same content (e.g., "xxx.dll"), the APIs 402-2 and 403-1 may be correlated as defining a behavior node. The syntax for calculating the contents of the variables may be described in pseudocode as:

Caculate1(path)
  URLDownloadToFileA(url, path);
  //path="xxx.dll"
  Caculate2(IpDllName)
  //IpDllName="xxx.dll"
  WriteProcessMemory(hProcess, IpDllName, strlen(IpDllName));

FIG. 6 shows a flow diagram of a method of detecting malware in a virtual machine sandbox in accordance with an embodiment of the present invention. The method of FIG. 6 may be performed by the sandbox 211. Other components may also be employed without detracting from the merits of the present invention.

In the example of FIG. 6, a sample process to be evaluated for malware is submitted to the sandbox 211. The execution inspector 311 is configured to look for checkpoints (step 601), with each checkpoint indicating when to interrupt and suspend execution of the sample process. The checkpoints may be at particular execution stages of the sample process where the malicious behavior of the sample process may be revealed. The checkpoints may be selected by antivirus researchers based on behavior of known malware in the wild. For example, a checkpoint may be set to interrupt the execution of the sample process when an exception occurs. Another example of a checkpoint is to set the API hook for ExitProcess, NtTerminateProcess when the current process exits itself.

After the checkpoints are configured, the sample process is executed (step 602) and monitored by the execution inspector 311 for checkpoint hits. When a checkpoint is hit (step 603), the code coverage profiler 312 identifies a hidden code segment of the sample process (step 604). The static behavior analyzer 313 scans the hidden code segment to identify APIs (or other functions) that are typically called by malware to perform a malicious behavior. More particularly, the static behavior analyzer 313 may disassemble the hidden code segment (step 630), identify APIs and related parameters from the disassembled hidden code segment (step 631), and trace references of parameters between the APIs (step 632). When a content of a variable of a parameter needs to be obtained for correlation, the static emulator 314 may be invoked to prepare the execution context for the emulation (step 640) and emulate a code block of the hidden code segment to trace parameters or API call trees to calculate the contents of variables of interest (step 641). The APIs are correlated into a behavior node (step 606), e.g., based on common parameter variables and contents. The execution of the sample process is resumed, and the cycle of checkpoint hit and behavior node identification continues until completion, such as when the sample process exits or in the event of a timeout (step 607 to step 603). The identified behavior nodes are correlated to form a behavior net (step 608), which is scored (step 609) to determine if the sample process is malware. For example, behavior nodes may be weighted and the total of the weights of behavior nodes of a behavior net may be compared to a threshold to determine if the sample process is malware.

As can be appreciated, embodiments of the present invention allow for detection of malware in a virtual machine sandbox even when the malware hides its malicious behavior while in the virtual machine. As a particular example, consider an advanced malware that evades detection by registering a specific malicious exception handler. A sample process of this malware will do nothing and wait a long time for the sandbox to timeout, which will trigger the specific exception to call a code block that performs a download and inject behavior (e.g., see FIG. 4, 401-1, "Download&Injection"). Also, a traditional full system sandbox will not find any malicious behavior for a hooked API "NtCreateRemoteThread" (wrapped by "CreateRemoteThread" in user mode in FIG. 4; see 402-1), which will not be called before the sample process exits. In embodiments of the present invention, the code coverage profiler 312 will detect the hidden code for the aforementioned behaviors because the hidden code is not executed or very infrequently executed during the sample execution. In that case, when a checkpoint is hit, such as when the sample process exits, the static behavior analyzer 313 will scan the hidden code including the malicious exception handler zone. By disassembling the hidden code in the exception handler, the relationship of the two key APIs "urlDownLoadToFileA" (FIG. 4, 402-2) and "NtCreateRemoteThread" (FIG. 4, 402-1) will be identified and correlated as a behavior node. Therefore, with embodiments of the present invention, malicious behavior may be identified even when the corresponding code is not executed.

A mixed analysis virtual machine sandbox has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
submitting a sample process to a sandbox implemented in a virtual machine for evaluation for malware;
executing the sample process in the virtual machine;
interrupting execution of the sample process in the virtual machine;
while execution of the sample process in the virtual machine is interrupted, identifying application programming interfaces (APIs) that are called by the malware to perform a malicious behavior, and correlating identified APIs to form a behavior node that comprises the identified APIs, wherein the identified APIs are correlated by finding a variable that is common to one or more parameters of the identified APIs;
identifying a hidden code segment of the sample process;
while execution of the sample process in the virtual machine is interrupted, emulating the hidden code segment in the virtual machine to determine a content of the variable;
correlating behavior nodes of the sample process into a behavior net; and
scoring the behavior net to detect that the sample process comprises the malware.

2. The method of claim 1, wherein the behavior nodes are correlated by finding a content or variable that is common among APIs of the behavior nodes.

3. The method of claim 1, further comprising:
after interrupting the execution of the sample process in the virtual machine, resuming execution of the sample process in the virtual machine;
interrupting the execution of the sample process in the virtual machine at least a second time; and
while the execution of the sample process in the virtual machine is interrupted at least the second time, identifying other APIs that are called by the malware to perform another malicious behavior.

4. The method of claim 1, wherein the behavior node defines the malicious behavior of injecting code into a process in memory.

5. The method of claim 4, wherein the behavior net defines a malicious behavior that involves downloading a file and injecting code of the file into the process in memory.

6. A system comprising:
a sandbox system comprising one or more computer devices that are configured to:
host a virtual machine;
receive a sample process in the virtual machine for evaluation for malware;
execute the sample process in the virtual machine;
interrupt execution of the sample process a first time in the virtual machine;
identify application programming interface (APIs) that are called by the malware to perform a malicious behavior while execution of the sample process in the virtual machine is interrupted the first time;
correlate identified APIs to form a behavior node that comprises the identified APIs, wherein the identified APIs are correlated by finding a variable that is common to one or more parameters of the identified APIs;
identify a hidden code segment of the sample process, and, while execution of the sample process in the virtual machine is interrupted the first time, emulate the hidden code segment in the virtual machine to determine a content of the variable;
correlate behavior nodes of the sample process into a behavior net; and
score the behavior net to detect the sample process comprises the malware.

7. The system of claim 6, wherein the sample process is of a file that was received by the sandbox system for a computer of a private computer network.

8. The system of claim 6, wherein the sandbox system provides in-the-cloud evaluation of data for malware.

9. The system of claim 6, wherein the sandbox system is configured to correlate the behavior nodes by finding a content or variable that is common among APIs of the behavior nodes.

10. The system of claim 6, wherein the sandbox system is configured to interrupt the execution of the sample process in the virtual machine at least a second time, and while the execution of the sample process in the virtual machine is interrupted at least the second time, identify other APIs that are called by the malware to perform another malicious behavior.

11. The system of claim 6, wherein the behavior node defines the malicious behavior of injecting code into a process in memory.

12. The system of claim 11, wherein the behavior net defines a malicious behavior that involves downloading a file and injecting code of the file into the process in the memory.

13. A non-transitory computer-readable medium comprising instructions store thereon, that when executed by a processor of a computer system, causes the computer system to perform the steps of:
submitting a sample process to a sandbox implemented in a virtual machine for evaluation for malware;
executing the sample process in the virtual machine;
interrupting execution of the sample process in the virtual machine;
while execution of the sample process in the virtual machine is interrupted, identifying application programming interfaces (APIs) that are called by the malware to perform a malicious behavior, and correlating identified APIs to form a behavior node that comprises the identified APIs, wherein the identified APIs are correlated by finding a variable that is common to one or more parameters of the identified APIs;

identifying a hidden code segment of the sample process;

while execution of the sample process in the virtual machine is interrupted, emulating the hidden code segment to determine a content of the variable;

correlating the behavior nodes of the sample process into a behavior net; and scoring the behavior net to detect the sample process comprises the malware.

* * * * *